May 3, 1949.    W. K. SMITH    2,469,012
HOE ATTACHMENT FOR RAKES
Filed Sept. 24, 1946

INVENTOR.
Will K. Smith
BY
Mellin & Hanscom
ATTORNEYS

Patented May 3, 1949

2,469,012

UNITED STATES PATENT OFFICE 2,469,012

HOE ATTACHMENT FOR RAKES

Will K. Smith, Arcadia, Calif.

Application September 24, 1946, Serial No. 698,944

1 Claim. (Cl. 56—400.05)

This invention relates in general to garden rakes and has for its object the provision of a hoe attachment therefore.

Frequently it is desirable to use the end of a rake as a hoe and although hoe attachments have been provided for tools of this character they have proved to be unsatisfactory for one reason or another and consequently are not to be found on the market.

More specifically the object of this invention is the provision of a rugged hoe attachment, simple in construction and which can be readily installed.

The invention possess other advantageous features, some of which with the foregoing will be set forth at length in the following description where one form of the invention which has been selected for illustration in the drawing accompanying and forming a part of the present specification is outlined in full. In said drawing, one form of the invention is shown, but it is to be understood that it is not limited to such form, since the invention as set forth in the claim may be embodied in other forms.

Referring to the drawing.

Figure 1:
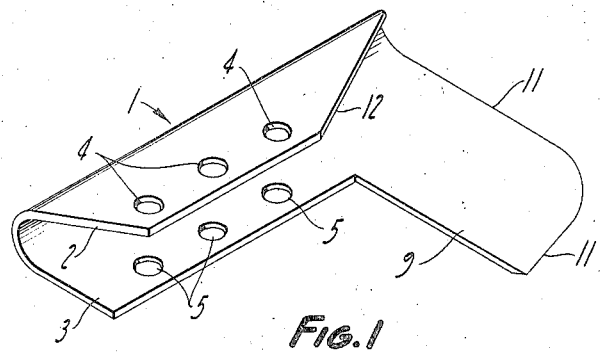
Fig. 1 is an isometric projection of a hoe attachment embodying the objects of my invention.

The attachment shown in these figures include a generally U-shaped clip 1 preferably made of steel plate and including opposed sides 2 and 3 each provided respectively with aligned bolt holes 4 and 5. The internal width of the clip is such that the back or ridge 6 of a rake 7 can be snugly accommodated therein and the longitudinal spacing of the holes 4 and 5 should be substantially equal to the spacing between the tines 8 of the rake.

Formed on the forward side 3 as a downward extension thereof is a hoe blade 9 provided with a beveled outer cutting edge 11. The length of the blade 9 should be substantially shorter than the depth of the rake tines 8 so as to permit the unobstructed use of the rake as a rake. The outer end of the rear side 2 is cut back as at 12 to leave the cutting edge 11 unobstructed throughout its entire length.

After the attachment has been thus fashioned it is hardened in accordance with standard procedure.

Figure 2:
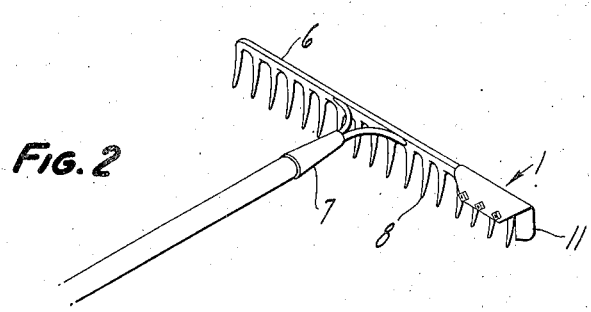
Fig. 2 is an isometric projection of a garden rake on which my hoe attachment has been installed.
Figure 3:
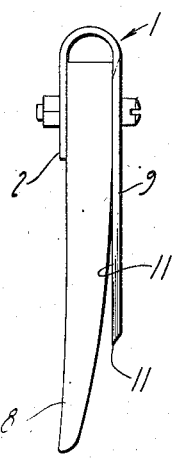
Fig. 3 is an enlarged end elevation of the rake and hoe attachment illustrated in Fig. 2.

To install the device it is simply slipped over the end of a rake and securely bolted in place as indicated in Fig. 2.

From the above disclosure it will be seen that I have provided an extremely simple and economically manufactured hoe attachment capable of being readily and securely fastened to a rake and which in no way impairs the normal operation of the rake.

I claim:

A hoe attachment for rakes comprising: a reversely bent metal sheet forming a channel for the snug accomodation of the back of a rake; said channel being provided at one end of one side thereof with a right angularly disposed blade extension; the side of said channel opposite said blade extension being cut away so as to leave the entire length of said blade unobstructed, and both sides of said channel being formed with aligned pairs of bolt holes arranged to intervene the tines of a rake to which said attachment is secured.

WILL K. SMITH.

REFERENCES CITED

The following references are of record in the file of this patent:

UNITED STATES PATENTS

| Number | Name | Date |
|---|---|---|
| 923,629 | Dalpay | June 1, 1909 |
| 1,537,005 | Carson | May 5, 1925 |
| 2,010,325 | Sawyer | Aug. 6, 1935 |
| 2,307,448 | Bouton | Jan. 5, 1943 |